Sept. 2, 1952
B. C. HARNEY
2,608,746
BAR FEED VIBRATION DAMPENER
Filed May 7, 1947
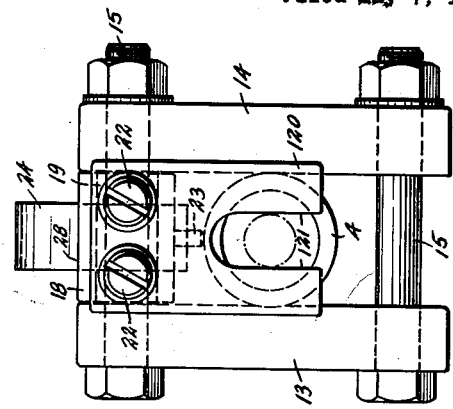
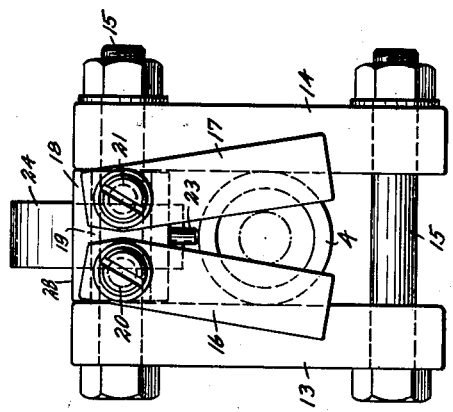
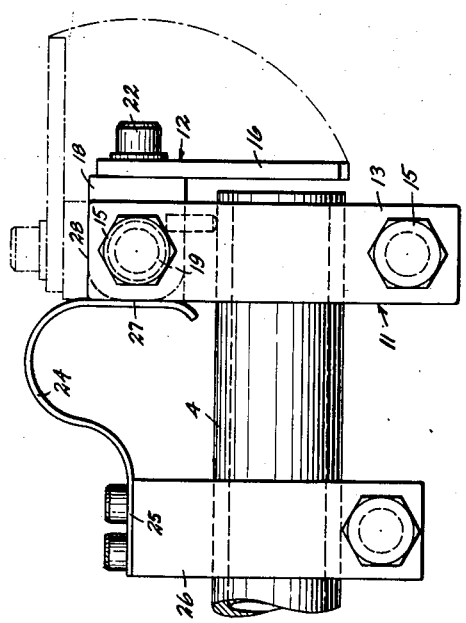
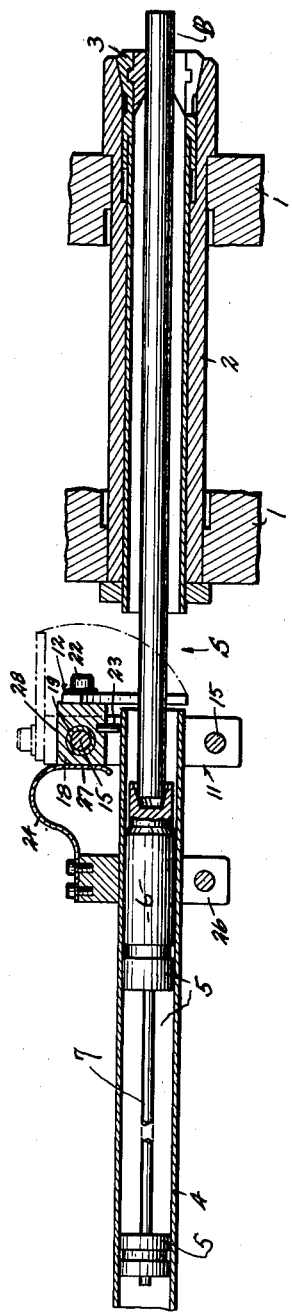
INVENTOR:
Bernard C. Harney,
BY
Bodell & Thompson
ATTORNEYS.

Patented Sept. 2, 1952

2,608,746

UNITED STATES PATENT OFFICE 2,608,746

BAR FEED VIBRATION DAMPENER

Bernard C. Harney, Syracuse, N. Y., assignor to Lipe-Rollway Corporation, Syracuse, N. Y., a corporation of New York Application May 7, 1947, Serial No. 746,463

3 Claims. (Cl. 29—59)

This invention relates to bar feeds for automatic metal working machines, and has for its object a vibration dampener or snubber for dampening or reducing the vibration occurring during the feeding of a piston in the feed tube into and through the rotating spindle of the machine.

It further has for its object, a vibration dampener located at the discharge end of the tube which is spaced apart from the end of the alined hollow rotating spindle of the machine through which spindle the bar is fed, and which dampener is so mounted in said space as to be shifted out of its normal or operative position by the feed piston or plunger when the plunger reaches the discharge end of the tube. In bar feeds of this type, the push piston moves across said space and into the hollow spindle of the machine and hence, one feature of the invention is the location of the dampener so as to be automatically shifted out of operative position by the plunger or piston.

The invention further has for its object a vibration dampener in which a dampener or guide member slidably contacts at least opposing sides of the rotating bar being fed, and is shiftable out of this position as by the feed plunger and held in its shifted position until returned to normal position by hand after a new bar has been loaded in the tube.

Other minor objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a fragmentary longitudinal sectional view of stock bar feed tube with the push piston or plunger therein, the adjacent portion of the head of the machine and hollow rotatable spindle in the head being shown in section.

Figure 2 is an enlarged side elevation of the feed tube with the vibration dampener thereon.

Figure 3 is a face view of parts seen in Figure 2.

Figure 4 is a view, similar to Figure 3, illustrating a modified form of the guide member of the dampener.

In pneumatic bar feeds where the bars are fed through the hollow spindle of the automatic screw machine by a push piston or plunger the bars, which are rotating during the machining operations, at times develop violent vibrations. The vibration may be due to the bars wobbling or rotating about an axis off the center of the axis of the spindle, or may be due to other forces developed during the rotation of the bar.

In Figure 1, the numeral 1 designates the head of an automatic machine in which a hollow spindle 2 is mounted, this having a collet 3 for gripping the bar when it is fed into working position and turning it with the spindle during the machining operation. The structure of the machine per se forms no part of the invention.

4 designates the feed tube or cylinder of the bar feed, and 5 the push piston or plunger therein which is operated by air pressure in the usual manner. The tube 4 is alined with the hollow spindle and its discharge end is spaced therefrom at S. This feature per se forms no part of the invention and for illustrations of such constructions, reference is made to Mariotte Patent No. 2,339,712, January 18, 1944, and Mariotte Patent No. 2,300,457, November 3, 1942. The pistons are of greater diameter than the bars being fed, and also the pistons, or the plunger heads 6 thereof, pass across the space S when the bar becomes short. The pistons are in two sections or heads joined by a connecting rod 7.

The vibration dampener here illustrated includes a body or clamp 11 mounted on the tube 4 near the discharge end thereof, and a guide member 12 carried by the body and normally extending across the end of the tube, it having a passage through which the bar B is fed, the opposite walls of the passage contacting the bar B only at substantially diametrically opposite sides thereof, and by so doing not only restrains any wobbling movement of the bar, but also dampens out other vibrations. The guide member is also mounted on the body to shift in a general lateral direction out of the path of the bar when the piston 5 reaches the discharge end of the tube before the head 6 passes across the space S, and means is provided for holding the guide member in its shifted out position, and also normally yieldingly restraining it from shifting out.

As seen in Figure 3, the body consists of opposing sections 13, 14, which are clamped on the discharge end of the tube 4, as by clamping members or bolts 15. The guide member, shown in Figures 2 and 3, is also formed in sections 16, 17, pivoted at like ends to a block 18 between the body sections 13 and 14 at one side of the tube 4, the axis of the pivot extending crosswise of the axis of the tube. The pivot is one of the clamping bolts 15 and, in order to relieve the block 18 of the clamping action, the bore of the block is mounted on a spacing tube 19 around the pivot bolt 15, these spacers merely avoiding clamping of the body sections 13, 14, tight enough to hold the block from pivotal movement. Each of the sections 16 and 17 are also shown in Figure 3 as pivoted at 20 and 21 to the block and normally held from pivotal movement in a predetermined adjustment, by screw clamping members 22. This adjustment permits the sections 16 and 17 to be separated different distances for bars B of different diameters.

The block is provided with a radially extending locating pin 23 which engages the periphery of the feed tube to determine the initial setting of the body sections 13, 14, so that the guide member is located in proper relation to the bars to be fed.

The pivotal movement of the guide member is restrained by spring means as 24 supported from the tube 4, the spring here shown being a leaf spring anchored at one end at 25 to a collar 26 clamped on the tube 4 at a point spaced slightly from the body 11, the spring here shown being formed with a loop therein, and its free end thrusting against either one of two angularly arranged surfaces or seats 27, 28, on the block 18 to normally press against the surface 27 to restrain the block from pivotal movement, but when the restraining force is overcome, as when the plunger or piston encounters the guide member 12, and the block is rocked against the force of the spring, the spring then comes in contact with the surface 28 and hence holds the guide member 12 in its shifted out position until it is returned by hand after the piston has returned to its starting position and the tube 4 loaded with a new bar. The collar 26 is adjustable along the tube 4 to vary the loading of the spring 24. The surfaces 27, 28, are seats located at different radial angles relative to the pivotal axis of the block 18, and the spring 24 coacts with the surface 27 when the guide member is in normal or operative position and with the surface 28 when in shifted out position. The spring 24, when engaged with the seat 28, also holds the guide member from returning to operative position after the plunger head 6 of the piston 5 passes out of the feed tube across the space S.

When hexagonal or square bars and the like are being operated on, a greater loading of the spring is necessary as such bars, during their rotation, have a greater tendency to shift the guide member than cylindrical bars or rods. Also, when polygonal bars are being operated, a guide member 120 of the form shown in Figure 4 is preferably used, this being merely formed with a slot 121 of a little larger diameter than the particular angular bar being operated on, instead of being formed with adjustable sections as 16, 17.

What I claim is:

1. In a stock bar vibration snubber for the feed tubes of metal working machines, said snubber comprising a body for mounting on the feed tube, a guide member pivoted to the body on a transverse axis relatively to the axis of the tube and located out of the body, the guide member having a passage, the walls of which slidably engage the stock bar at spaced points during the feeding thereof, and spring means for normally holding the guide member from pivotal shifting movement.

2. In a stock bar vibration snubber for the feed tubes of metal working machines, said snubber comprising a body for mounting on the tube, and a guide member pivoted to the body on a transverse axis relatively to the axis of the tube and located outside of the body, the guide member extending across the tube and having a passage, the walls of which slidably engage the stock bar, said guide member being provided with seats located at different radial angles relative to the pivotal axis of said member, and spring means coacting with one seat when said member is in normal position and with the other seat when said member is shifted on its pivot out of normal position.

3. In a stock bar vibrator snubber for the feed tubes of metal working machines, said snubber comprising a body for mounting on the said tube, a guide member pivoted to the body on a transverse axis relative to the axis of the tube and located out of the body, the guide member having a passage, the walls of which slidably engage the stock bar at spaced points during the feeding thereof, and yieldable biasing means for normally holding the guide member from pivotal shifting movement.

BERNARD C. HARNEY.

REFERENCES CITED

The following references are of record in the file of this patent:

UNITED STATES PATENTS

| Number | Name | Date |
|---|---|---|
| 301,185 | Tyler et al. | July 1, 1884 |
| 568,551 | Vierengel | Sept. 29, 1896 |
| 1,059,225 | Sherrill | Apr. 15, 1913 |
| 1,828,289 | Michell | Oct. 20, 1931 |
| 1,935,999 | Tessky | Nov. 21, 1933 |
| 2,300,457 | Mariotte | Nov. 3, 1942 |

FOREIGN PATENTS

| Number | Country | Date |
|---|---|---|
| 385,552 | Great Britain | Dec. 29, 1932 |